United States Patent
Klager et al.

(10) Patent No.: US 7,587,510 B1
(45) Date of Patent: Sep. 8, 2009

(54) SYSTEM AND METHOD FOR TRANSFERRING DATA BETWEEN A USER SPACE AND A KERNEL SPACE IN A SERVER ASSOCIATED WITH A DISTRIBUTED NETWORK ENVIRONMENT

(75) Inventors: Andrew David Klager, Round Rock, TX (US); Robert Lee Rhudy, Austin, TX (US)

(73) Assignee: Charles Schwab & Co., Inc., San Francisco, CA (US)

( * ) Notice: Subject to any disclaimer, the term of this patent is extended or adjusted under 35 U.S.C. 154(b) by 845 days.

(21) Appl. No.: 10/420,055

(22) Filed: Apr. 21, 2003

(51) Int. Cl.
  *G06F 15/16* (2006.01)
  *G06F 3/00* (2006.01)
  *G06F 9/44* (2006.01)
  *G06F 9/46* (2006.01)
  *G06F 13/00* (2006.01)
  *G06F 13/24* (2006.01)
  *G06Q 10/00* (2006.01)

(52) U.S. Cl. .............. 709/232; 709/203; 709/217; 709/219; 709/250; 710/260; 710/261; 710/263; 710/266

(58) Field of Classification Search ............ 709/203, 709/232, 217, 219, 250; 719/321, 328; 710/56, 710/260–266
See application file for complete search history.

(56) References Cited

U.S. PATENT DOCUMENTS

| | | | |
|---|---|---|---|
| 5,740,467 A * | 4/1998 | Chmielecki et al. ........... 710/56 |
| 6,012,121 A * | 1/2000 | Govindaraju et al. ....... 710/260 |
| 6,016,513 A * | 1/2000 | Lowe ......................... 709/250 |
| 6,256,660 B1 * | 7/2001 | Govindaraju et al. ....... 709/200 |
| 6,338,078 B1 * | 1/2002 | Chang et al. ................. 718/102 |
| 6,373,841 B1 * | 4/2002 | Goh et al. .................... 370/389 |
| 6,675,218 B1 * | 1/2004 | Mahler et al. ............... 709/230 |
| 6,829,662 B2 * | 12/2004 | King-Smith et al. .......... 710/56 |
| 6,956,818 B1 * | 10/2005 | Thodiyil ..................... 370/230 |
| 2002/0091863 A1 * | 7/2002 | Schug ......................... 709/250 |
| 2002/0138664 A1 * | 9/2002 | Blott et al. .................. 709/328 |
| 2003/0041118 A1 * | 2/2003 | Elnozahy et al. ............ 709/218 |

OTHER PUBLICATIONS

J. Chase, A. Gallatin, and Ken Yocum, "End-system Optimizations for High-Speed TCP", IEEE Communications special issue on high-speed TCP, 2001. http://www.cs.duke.edu/ari/publications/end-system.pdf.*

* cited by examiner

*Primary Examiner*—Ario Etienne
*Assistant Examiner*—Philip J Chea
(74) *Attorney, Agent, or Firm*—Townsend and Townsend and Crew LLP

(57) ABSTRACT

A system (150) and method provide for the transfer of at least one packet (194) comprising data between a user space (152) and a kernel space (154) associated with a server (156) that is positioned in a distributed network arrangement (192) with a plurality of clients (158, 160, 162, 164). A distribution program (168) associated with the user space (152) is operable to accumulate the at least one packet (194). An application program interface (174) associated with the user space (152) transfers the at least one packet (194) to the kernel space (154) with a number of software interrupts (204). A driver (176) associated with the kernel space (154) is operable to distribute the at least one packet (194) to a subset of the plurality of clients (158, 160, 162, 164) in response to receiving the number of software interrupts (204). The number of software interrupts (204) is less than one software interrupt per packet per client.

10 Claims, 8 Drawing Sheets

SYSTEM AND METHOD FOR TRANSFERRING DATA BETWEEN A USER SPACE AND A KERNEL SPACE IN A SERVER ASSOCIATED WITH A DISTRIBUTED NETWORK ENVIRONMENT

TECHNICAL FIELD OF THE INVENTION

This invention relates in general to data distribution in a distributed network environment including a server and a plurality of clients and, in particular, to a system and method for transferring data between a user space and a kernel space in a server associated with a distributed network environment.

BACKGROUND OF THE INVENTION

Without limiting the scope of the present invention, its background will be described with regard to trading common stock, as an example.

In trading common stock, there are three fundamental factors an investor must consider. These factors are what stock to trade, when to open a position in the stock and when to close that position in the stock. There are enumerable models that attempt to help the investor identify these factors each of which are based upon particular criteria. Some of the models are best suited for the long-term investor using a buy and hold approach. Other models are better suited for the short-term investor including, for example, an active investor who opens and closes positions in the same day or week.

In determining what stock to trade, a typical long-term investor may perform substantial research into a particular company in an effort to evaluate the future success of that company. For example, a long term investor may evaluate whether the company has products or services that are likely to have an increase in sales, the effectiveness of a company's research and development, the profit margin of the company, the size and effectiveness of the company's sales organization, labor relations within the company, the quality of management personnel at the company, the competitiveness of the company in relation to other companies in the industry, the long range outlook for profits and the like.

In addition to these business related factors, the long term investor may look at factors such as whether the company typically pays dividends on common stock, the price to earnings ratio of the stock and the market capitalization of the company as well as earnings, revenue and net income of the company. On the other hand, an investor that is interested in short term investments may not perform such detailed research but instead may focus on factors such as volume of trades, proximity to a milestone such as a fifty two week high, difference between current volume and a historical volume, number of daily highs, money flow and the like in identifying a stock of interest.

Once an investor has identified a stock of interest, the investor must then determine when and how to open a position in that stock. A long-term investor might, for example, call a broker and request the purchase of a certain number of shares of the stock at the market price. The short term investor, however, who may be more interested in such factors as the volatility of the stock or the liquidity of the stock in making such a decision may want to use an online system to place an order to achieve faster execution.

The next step for an investor once they have opened a position in a stock is to determine when to close that position. A long term investor may, for example, make a decision to sell a stock based upon factors such as a fundamental change in a company that does not comport with the investor's original criteria for buying stock in that company, a change in management in the company, under performance of the stock, the stock reaching an unacceptable low, a belief that the stock has peaked or simply a belief that another investment has better long term prospects. Again, the long-term investor may call a broker and request that the stock be sold at a particular time or when it reaches a particular price. While some of the above factors may also be important to a short-term investor, a short-term investor may focus more heavily on such factors as the continued momentum of the stock or simply making certain all open positions are closed by the end of a day and may again use an online system to achieve trade execution.

Regardless of the investment strategies, however, the investor requires information relative to what to stock to trade, when and how to open a position in that stock and when and how to close the position in that stock. Therefore, a need has arisen for a system and method that provide the investor with information that is useful in selecting stocks and that allow the investor to execute trades. A need has also arisen for such a system and method that provide the information the investor requires in a manner that optimizes system resources.

SUMMARY OF THE INVENTION

The present invention disclosed herein comprises a system and method that provide information to the investor in a manner that optimizes system resources by minimizing the interrupt overhead associated with transferring data packets between a user space and a kernel space associated with a server that is in a distributed network environment. The present invention optimizes the system resources, and, in particular, interrupt overhead and memory allocation, by providing for the time deferred processing of data packets being transferred between the user space and the kernel space.

In one aspect, the present invention is directed to a system for minimizing the frequency of mode transfers between a user space and a kernel space associated with a server in a distributed network environment. The system comprises a driver associated with the kernel space that is operable to queue user space-bound packets and process the packets with one interrupt. In addition, the system comprises a driver-compliant application interface associated with the user space is operable to queue kernel space-bound packets and process the packets with one interrupt.

In another aspect, the present invention is directed to a system for transferring at least one packet comprising data between a user space and a kernel space associated with a server that is in a distributed network arrangement with a plurality of clients. A distribution program is associated with the user space in order to accumulate the at least one packet. An application program interface associated with the user space transfers the at least one packet to the kernel space with a number of software interrupts. A driver is associated with the kernel space that distributes the at least one packet to a subset of the plurality of clients in response to receiving the number of software interrupts. The number of software interrupts is less than one software interrupt per packet per client.

In one embodiment, the number of software interrupts comprises one software interrupt. In another embodiment, the distribution program may accumulate the multiple packets over a nominal period of time. In a further embodiment, the system may include a memory structure associated with the kernel space to store the multiple packets in a buffer.

In an additional aspect, the present invention is directed to a system for transferring multiple packets between a kernel space and a user space associated with a server. A driver is associated with the kernel space to accumulate the multiple packets relative to data transfers between a subset of the plurality of clients and the server. The driver transfers the multiple packets to the user space with a number of software interrupts. A driver-compliant application program interface associated with the user space is operable to receive the multiple packets. The number of software interrupts is less than one software interrupt per packet per client. In one embodiment, the packets may include information selected from the group consisting of connections, reads, send errors and disconnects.

In a further aspect, the present invention is directed to a method for transferring data packets between a kernel space and a user space associated with a server that is in a distributed network arrangement with a plurality of clients. The method comprises receiving the data packets in the kernel space. The data packets are relative to a network data distribution between a subset of the plurality of clients and the server. The method further comprises accumulating the data packets in a memory structure associated with the kernel space and transferring the data packets from the kernel space to the user space in response to a user initiated software interrupt. Alternatively, the driver is operable to accumulate at least one packet and transfer an indication representative of the information in the accumulated packets to the user space with a number of software interrupts.

In one embodiment, the method further comprises establishing a socket connection between the server and the subset of the plurality of clients. The method may further comprise the step of monitoring connection status conditions between the server and the subset of the plurality of clients.

In another aspect, the present invention is directed to a computer program embodied on a computer readable medium for transferring data between a kernel space and a user space associated with a server that is in a distributed network arrangement with a plurality of clients.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
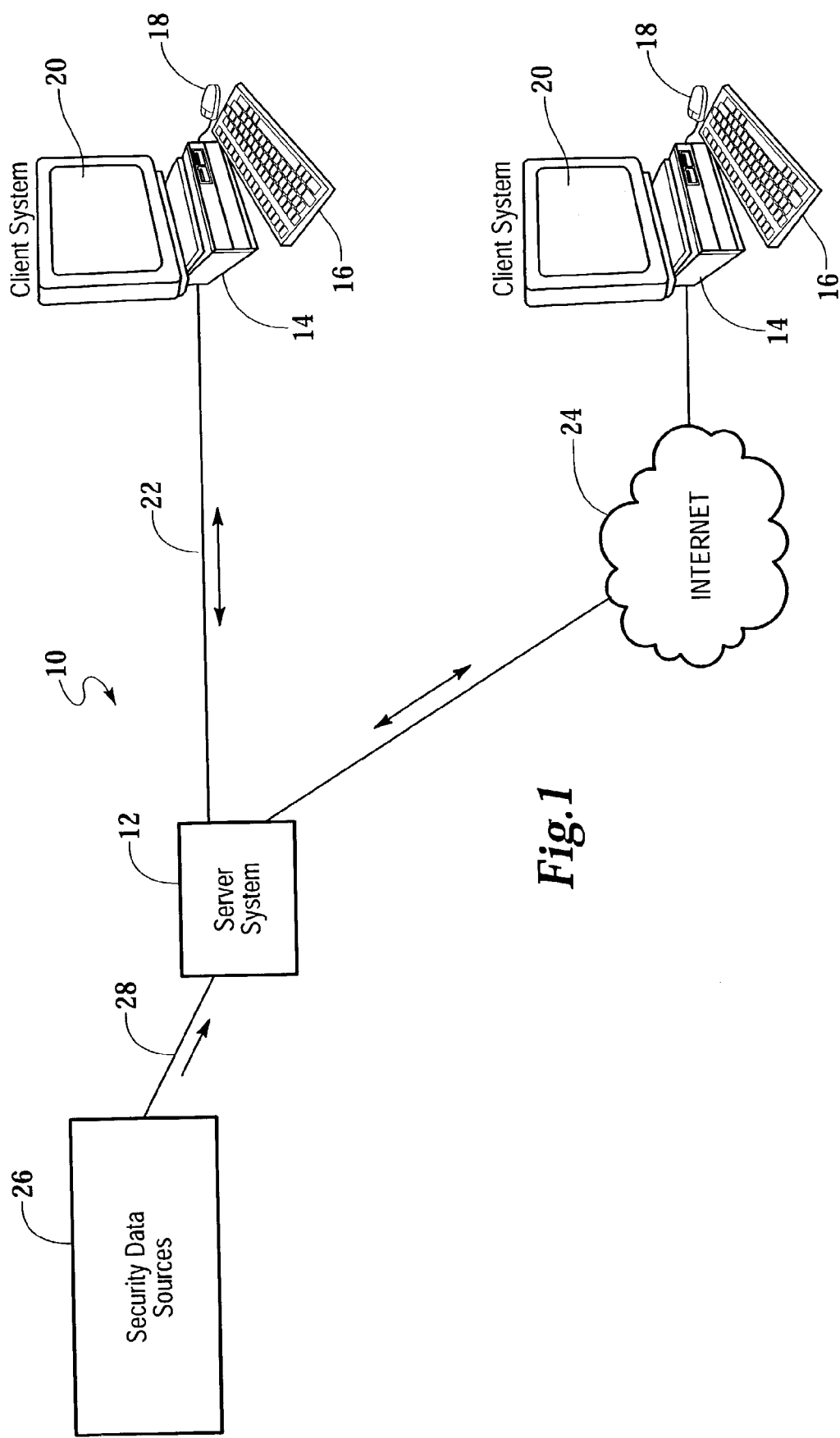
FIG. 1 is a platform diagram of a server system employing the teachings of a present invention in a distributed network arrangement with multiple client systems.

Referring initially to FIG. 1, therein is depicted a platform layout of a system including a server that is in a distributed network environment employing the teachings of the present invention that is generally designated 10. As illustrated, system 10 includes a server system 12 and a pair of client systems 14. Client systems 14 may include any number of peripheral input, storage and display devices such as a keyboard 16, a mouse 18 and a monitor 20. Server system 12 may communicate with each client system 14 by any suitable means. In one illustrated embodiment, server system 12 is in communication with a client system 14 via a direct connection 22 such as a T1 line, a frame, a dial up modem or the like. In the other illustrated embodiment, server system 12 is in communication with the other client system 14 via an Internet connection 24.

Server system 12 is also in communication with one or more security data sources 26 via a T1 line, a high speed modem or other transmission line 28 using, for example, a direct socket connection such as a Transmission Control Protocol/Internet Protocol (TCP/IP) connection. Security data sources 26 provide data feeds to server system 12 from a plurality of sources such as PC Quote, S&P Comstock, NQDS and the like that contain all types of information relating to thousands of securities that are traded at the various market participants. The data feeds contain a variety of information relating to each security. For example, the data feeds may contain level I information, which is best ask and best bid information as well as time and sales information and level II information which includes detailed market information. In addition, the data feeds may include fundamental information such as market capitalization, sector information, price to earning ratio, 52 week highs and lows and the like. It should be noted by those skilled in the art that the term security as used herein refers to stocks, bonds, options and the like that are traded at the various market participants.

In the illustrated networked computer environment, server system 12 regularly generates packets comprising securities data for distribution to client systems 14. As the amount of information received and processed by server system 12 from security data sources 26 is voluminous, each client system 14 typically receives only the information that the user of client system 14 requests. As such, each client system 14 requests and receives only a small subset of the information processed by server system 12. A dissemination of data to client systems 14 during a nominal time period may include the transfer of multiple packets containing requested data to a particular client. Alternatively, the dissemination of data during a nominal time period may include the transfer of identical packets of data to multiple clients.

In order to distribute the packets, existing servers generate one kernel or software interrupt for each packet for each client. In applications requiring real time data feeds, such as the tracking and trading of common stock, the large number of clients and large number of packets transferred results in excessive interrupt overhead. The present invention minimizes interrupt overhead by providing a server system 12 that includes a driver and driver-compliant application which provide a networking programming interface that queues packets and processes the packets with a minimum number of software interrupts.

Figure 2:
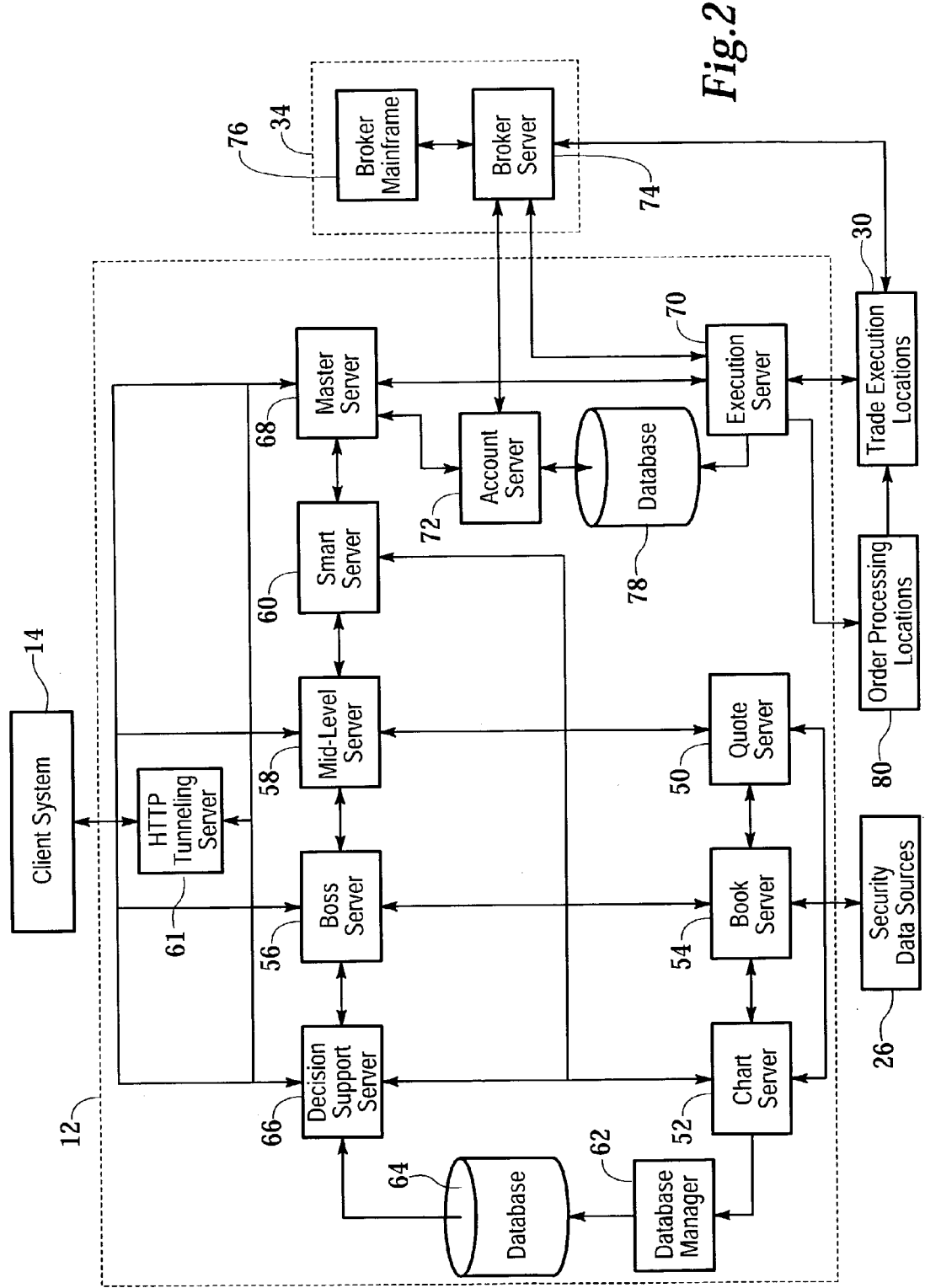
FIG. 2 is a block diagram of a system for processing trade executions among multiple market participant types wherein the teachings of the present invention may be practiced.

Referring now to FIG. 2, therein is depicted a more detailed diagram of server system 12 of the system of the present invention. Server system 12 comprises numerous integrated servers that enable the processing of security data received from security data sources 26 for dissemination to various client systems 14 based upon the request made from each client system 14 and that route orders generated by the user of client systems 14 to various trade execution locations 30 which include multiple market participant types.

Specifically, server system 12 includes a quote server 50, a chart server 52 and book servers 54. Quote server 50 receives the data feed from one or more of the security data sources 26 and parses the data based upon the feed parsing API. The parsed information may be sent via direct connection to a client system 14 upon request by a client system 14. In the illustrated embodiment, however, the connection between quote server 50 and client system 14 includes a mid-level server 58 and an HTTP tunneling server 61 as will be explained in more detail below. As such, quote server 50 may disseminate real-time first level security data, real-time second level security data and the like to client system 14. For speed of delivery to client systems 14, some of this data preferably resides in the cache memory of quote server 50 or may alternatively reside in RAM on mid-level server 58.

Chart server 52 receives the data feed from one or more of the security data sources 26 and parses the data based upon the feed parsing API. Database manager 62 further processes the parsed information such that information relating to the securities may be stored in database 64. Database 64 is used for historical charting of security data. For example, database 64 builds one, two, three and five minute charts for intraday activity as well as historical charts for daily volume, daily highs and lows and the like for specified time increments such as the prior week, month or year. Database 64 is preferably an in-memory database utilizing cache memory and RAM such that information requested by a client system 14 can be quickly disseminated.

Book server 54 receives the data feed from one or more of the security data sources 26 and parses that data based upon the feed parsing API. More specifically, each book server 54 receives book data from, for example, an ECN or a market maker. The book data feeds contain not only the first and second level security data but also information relating to all the available asks and bids of each security.

Mid-level server 58 monitors information on a subset of the securities on which data feeds are received. While quote server 50, chart server 52 and book server 54 monitor all securities, perhaps 12,000 to 15,000 or more, mid-level server 58 only monitors those securities that are frequently requested by a client system 14, perhaps several hundred to a few thousand. For example, mid-level server 58 monitors all open positions that users presently have as well as additional securities that are being watched by such users, for example, those that are part of real-time user requests. Use of mid-level server 58 adds flexibility to server system 12 by reducing the load on the other servers. In addition, the use of mid-level server 58 enhances the speed at which information is disseminated to client systems 14 by, among other things, gathering, combining and placing in cache memory data from quote server 50, chart server 52 and book server 54 such that a request from a client system 14 does not have to be processed by more than one server.

It should be understood by those skilled in the art that the use of the term server herein may mean a single physical server, multiple physical servers or multiple instances of an execution on a single physical server. As will be discussed in more detail hereinbelow, the present invention minimizes the required number of servers, however, by providing a scheme that minimizes a server's interrupt overhead and optimizes the server's memory allocation.

In addition to the above-described servers, server system 12 may include a boss server 56 that manages the operation of the other servers. Boss server 56 optimizes the processing of server system 12 by routing connection requests from client systems 14 to the servers within server system 12, for example, to a specific mid-level server 58, that is presently operating with appropriate capacity to handle the new connection to avoid overloading any of the servers.

Server system 12 includes smart server 60 that processes orders received from client systems 14, such that the best fill for that order is obtained. For example, smart server 60 may parse an order into a plurality of suborders, each of which are sent to a trade execution location 30 to be filled. When all of the suborders are filled, at the best price for that suborder, the best price is obtained for the order. For connection between server system 12 and client systems 14 over the Internet, server system 12 may also include HTTP tunneling server 61. HTTP tunneling server 61 allows client systems 14 to work through firewalls, proxy servers and the like.

Server system 12 includes a decision support server 66. As with the mid-level server 58, decision support server 66 performs specific tasks which enable server system 12 to be more responsive to client systems 14. Decision support server 66 provides a data feed to client systems 14 that help a user of a client system 14 to select a security of interest. In the illustrated embodiment, decision support server 66 receives data feeds from chart server 52 and quote server 50. In addition, decision support server 66 receives a data feed from data compiled in database 64.

Server system 12 also includes a master server 68 and an execution server 70. Client systems 14 may connect directly to master server 68 or may connect through HTTP tunneling server 61. In either case, once a user of a client system 14 connects to server system 12, client system 14 receives IP addresses from boss server 56 then connects to master server 68. Master server 68 loads information relating to that user into memory from account server 72. Account server 72 retrieves user information via a connection to broker server 74 located remotely at broker system 34. Broker server 74 queries a broker mainframe 76 for the required information. The information is then passed back to account server 72 via broker server 74. Account server 72 then populates the cache memory of master server 68 with the client information.

Account server 72 also sends the client information to a database 78, to repopulate the client information in database 78 and to update any discrepancies between client information in database 78 and broker mainframe 76. In addition, to assure a high level of availability, if the client information cannot be obtained from broker system 34, account server 72 may alternatively obtain the client information previously stored in database 78.

Once master server 68 has received the client information, master server 68 monitors orders from client system 14 and performs compliance checks on the orders. For example, master server 68 would reject an order from client system 14 if the user attempts a trade that exceeds the user's buying power. Likewise, master server 68 would disallow an order from client system 14 that would be in violation of securities regulations. Once the compliance checks are completed, master server 68 sends the order to execution server 70.

Execution server 70 receives the orders from master server 68. Execution server 70 then routes the orders directly to a trade execution location 30, such as the ECN of Isld or the market maker of BEST, indirectly to a trade execution location 30 via an order processing location 80, such as SOES or Select Net for a NASDAQ trade or Super DOT for an NYSE trade, or indirectly to a trade execution location 30 via broker system 34. For example, a user may request execution at a specific market participant, such as Isld, in which case execution server 70 will send the order directly to the requested trade execution location 30. Alternatively, the user may request execution at a specific market participant type, such as any ECN, but may allow server system 12 to automate the selection of the specific ECN. In such a case, server system 12 may select a trade execution location 30 based upon factors such as the liquidity of the security at a particular trade execution location 30, the speed at which a particular trade execution location 30 fills orders, the ratio of orders filled at a particular trade execution location 30 and the like. In either case, once the trade execution location 30 is selected, the order is formatted for the proprietary application programming interface of that trade execution location 30 by execution server 70. The order is then sent to that trade execution location 30 to be filled.

The system and method for transferring data between a user space and a kernel space in a server associated with a distributed network environment of the present invention may be practiced between any two computers connected in a server-client or co-located server relationship. For example, with reference to FIG. 2, the present invention may be practiced between decision support server 66, boss server 56, mid-level server 58, master server 68, chart server 52, book server 54, quote server 50 and/or client system 14, for example. The driver and driver-compliant application programming interface of the present invention provide a networking interface that queues asynchronous and synchronous packets and processes the packets with one software interrupt. Accordingly, the teachings of the present invention are applicable to any two computers that exchange information.

By way of illustration and not by way of limitation, however, the following FIGS. 4-10 will describe the systems and methods of the present invention in relation to mid-level server 58 and multiple client systems 14. Moreover, by way of illustration and not by way of limitation, the present invention will be described relative to the distribution of securities information. It will be appreciated by one skilled in the art, however, that the teachings of the present invention are practicable with any type or form of data distribution.

Figure 3:
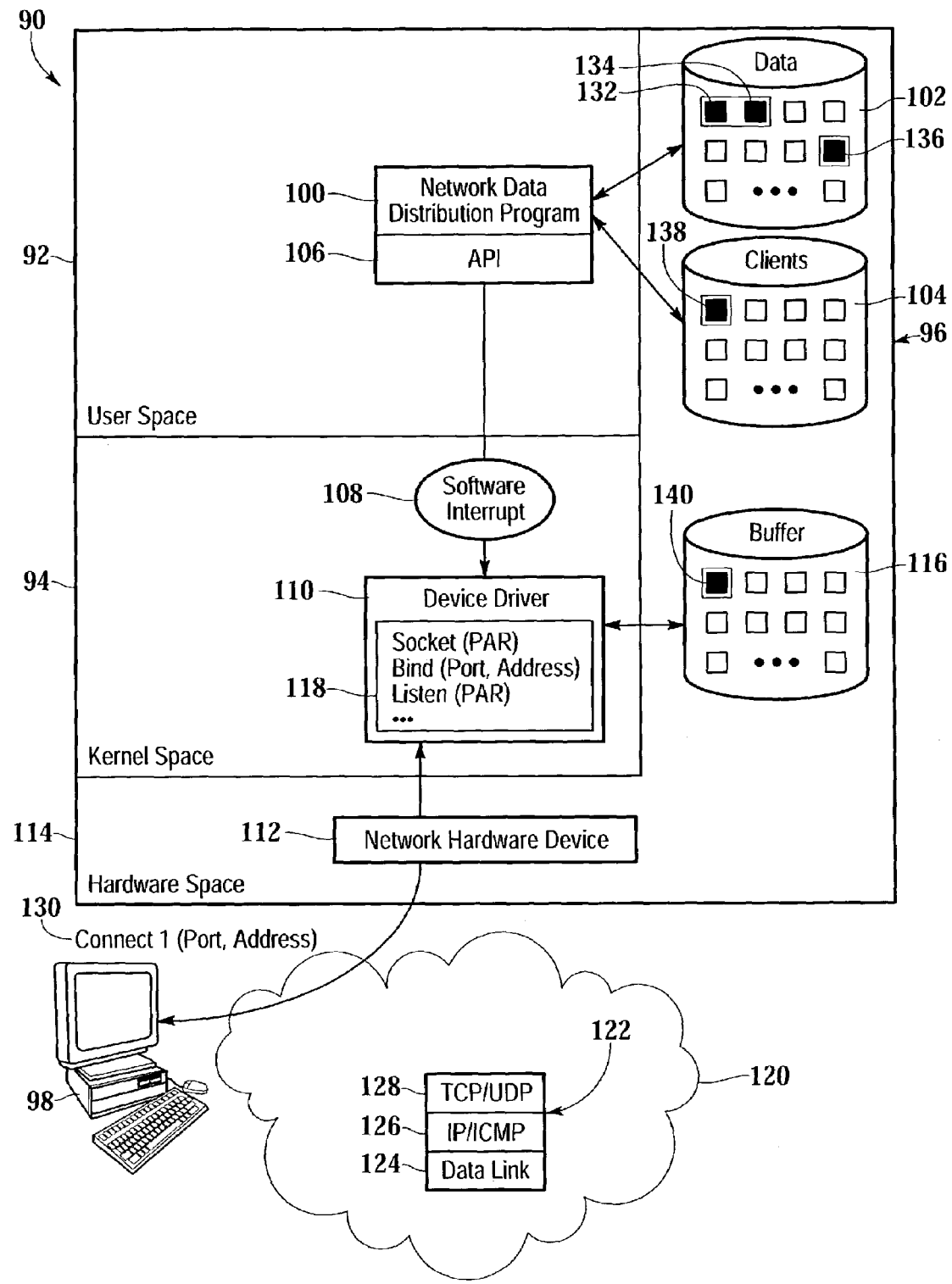
FIG. 3 is a schematic diagram of a system for transferring data between a user space and a kernel space associated with a server that is distributing multiple data packets to a single client.

FIG. 3 depicts a system 90 for transferring data between a user space 92 and a kernel space 94 associated with a server 96 that is distributing multiple data packets to a single client 98. User space 92 includes user software application programs that carry out various useful tasks by accessing underlying services provided by kernel space 94. In particular, a network data distribution program 100 provides the instructions that control packet transfer from server 96 to client 98. A database 102 is associated with network data distribution program 100 to provide access to information or data of interest to client 98. Database 102 may include packets comprising fundamental information such as market capitalization, sector information, price to earning ratio, 52 week highs and lows and like information that client 98 may consider useful.

Similarly, a database or memory structure 104 is associated with network data distribution program 100 to provide access to client-related information. Database 104 may include connectivity information, client-profile information detailing the fundamental information of interest to client 98 and similar information that network distribution program 100 may employ to distribute information to client 98. A driver-compliant application program interface (API) 106 provides formalized software interrupts to access the underlying services provided by kernel space 94. As will be discussed in more detail hereinbelow, a software interrupt 108 signals kernel space 94 that network distribution program 100 has generated packets for distribution to client 98.

Kernel space 94 provides the system-level commands and functions that manage system resources such as device drivers, memory management routines, scheduling and system calls, for example. In general, device drivers provide the necessary software components that permit the server to communicate with platform hardware devices associated with a hardware space that provides the actual physical computing machinery. In particular, a device driver 110 provides control for a network hardware device 112 associated with a hardware space 114. Device driver 110 may be a single static or loadable software module such as a kernel subsystem that implements the fundamental aspects of the software interrupt management system described herein. Memory structure 116 is associated with device driver 110 in kernel space 94 to provide buffers for processing packets and software interrupts 108 received from user space 92. Device driver 110 and driver-compliant API 106 provide software interrupt servicing between user space 92 and kernel space 94 that minimizes interrupt overhead by batch processing packets and packet related information with a minimum number of interrupts. Preferably, over a nominal duration of time, packets and packet related information are deferred time processed with a single software interrupt.

Hardware space 114 includes components such as liquid crystal displays (LCD) panels, video adapters, integrated drive electronics (IDEs), network hardware device, CD-ROMs, memory structures and hard disk controllers, for example. As alluded to in the previous paragraph, network hardware device 112 enables network interface functionality that allows server 96 to transmit and receive data communications with the external environment and, in particular, client 98. Depending on the network protocol employed, network hardware device 112, which may take the form of a local area network (LAN) card, employs a particular physical addressing scheme. In the illustrated TCP/IP protocol type connection, network hardware device 112 includes an assigned or configurable Ethernet address, i.e., a media access control (MAC) or hardware address, which identifies server 96 to the external environment in order to allow packets to reach the correct destination.

Device driver 110 includes a socket port descriptor 118 that is operable to provide the port-level connectivity necessary to establish socket connection communications with client 98 via network hardware device 112 and network 120. As illustrated, TCP/IP protocol type connection 122, which may be effectuated by the Internet, for example, includes a physical layer 124 or data link, such as Ethernet or token-ring, that is responsible for the delivery of packets. A network layer 126 that comprises an IP layer may sit above physical layer 124 in the stack. A transport layer 128 that comprises a TCP layer sits above the network layer 126 and may be independent of both physical layer 124 and the network layer 126.

Remote client socket identifier 130 uniquely identifies the endpoint of the communication link between network data distribution program 100 and the client application program of server 96 and client 98, respectively. The socket connection, as exemplified by socket port descriptor 118 and remote client socket identifier 130, initiates and accepts communications, sends data, receives data and terminates the connection gracefully. As illustrated, the socket connection may be a stream socket connection wherein when client 98 connects to server 96, a new socket is created and server 96 uses that socket for communication with client 98. The stream socket connection employs a series of well-known connection calls such as Socket(PARAMETER), Bind(PARAMETER), Listen(PARAMETER) and Accept(PARAMETER), for example, to provide reliable connected networking services with minimal packet error. It should be appreciated that although a specific type of connection has been described, other types of server-client connection protocols are within the teachings of the present invention.

In operation, network data distribution program 100 accumulates packets 132, 134, 136 over a nominal time period for distribution to client 98 in accordance with client-related data 138. Packets 132, 134, 136 may be synchronously or asynchronously generated. For instance, packets 132, 134, 136 may be synchronously generated in response to a periodic update client 98 receives relative to securities of particular interest to the client and the substantially real-time performance of the stock market. Alternatively, packets 132, 134, 136 may be asynchronously generated and accumulated over a nominal time period in response, for example, to a series of market-related requests received from client 98. Regardless of the method of packet initiation, API 106 sends packets 132, 134, 136 to device driver 110 with software interrupt 108. By accumulating packets 132, 134, 136 over a nominal time period and transferring packets 132, 134, 136 to client 98 with a single software interrupt, interrupt overhead is minimized and system resources are optimized. This represents a significant reduction in software interrupts over existing implementations wherein existing API's employ a one to one relationship between software interrupts and packets to be sent to each client, i.e., each packet to each client requires one software interrupt or stated another way, one software interrupt is required per packet per client.

Responsive to software interrupt 108, device driver 110 temporarily stores packets 132, 134, 136 going to client 98 in a single buffer 140 prior to distributing packets 132, 134, 136 to client 98 via the socket connection. Storing packets 132, 134, 136 in a single buffer 140 prior to distribution, rather than employing one memory buffer for each of the packet 132, 134, 136 as with existing device drivers, results in fewer memory allocations and less total memory, thereby optimizing system resources.

Figure 4:
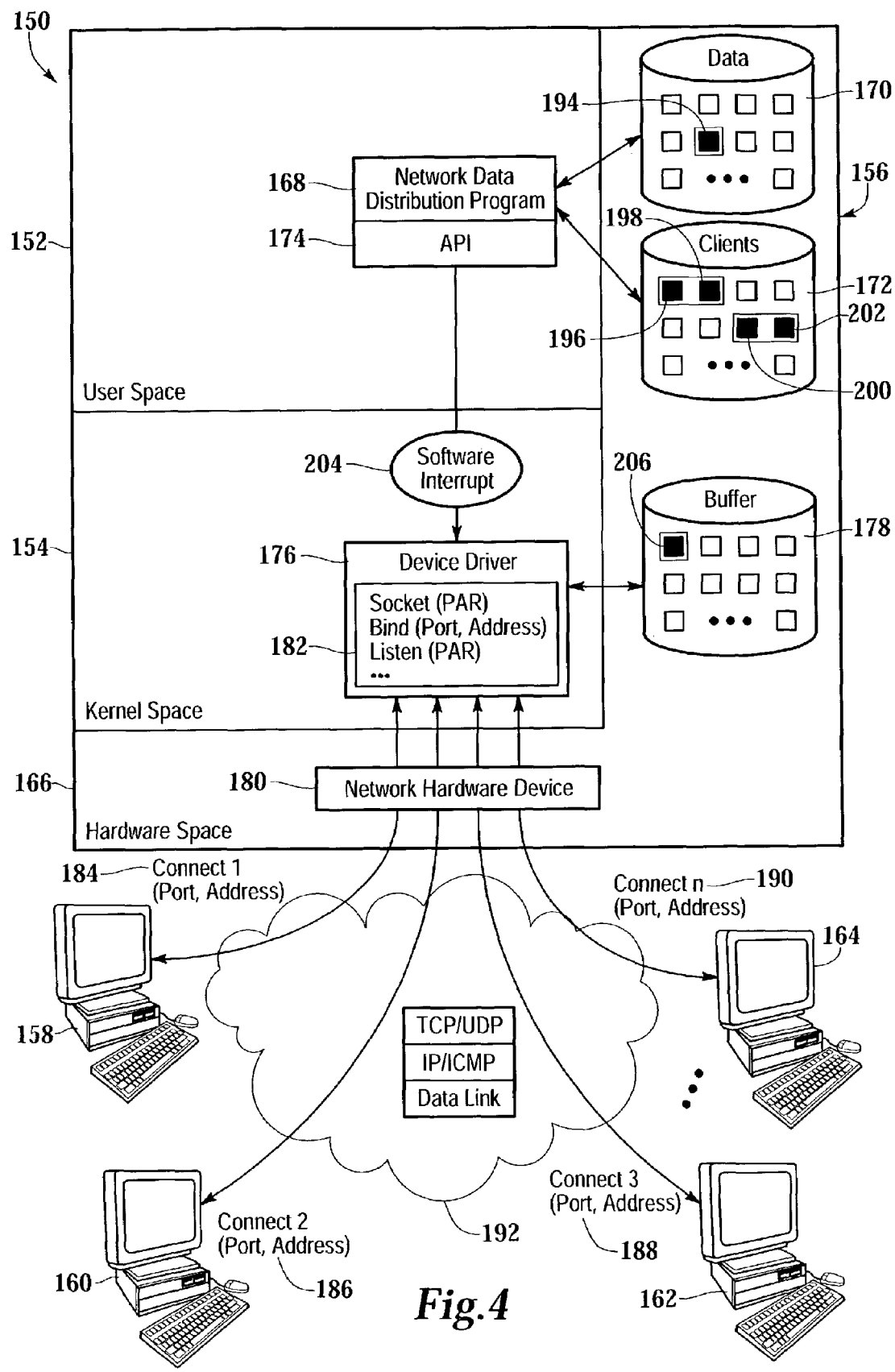
FIG. 4 is a schematic diagram of a system for transferring data between a user space and a kernel space associated with a server that is distributing a single data packet to multiple clients.

FIG. 4 depicts a system 150 for transferring data between a user space 152 and a kernel space 154 associated with a server 156 that is distributing a single data packet 194 to multiple clients 158, 160, 162, 164. Similar to system 90 of FIG. 3, system 150 includes user space 152, kernel space 154 and hardware space 166. User space 152 includes a network data distribution program 168 having access to market related data memory structure 170 and client-related information memory structure 172. Driver-compliant API 174 provides access to the network distribution services of kernel space 154 via software interrupts 204 that are sent to device driver 176. A memory structure 178 provides a buffer 206 for packets received from the network data distribution program 168. Network hardware device 180 enables socket file descriptor 182 to form a socket connection with remote client socket identifiers 184, 186, 188, 190 via a TCP/IP network 192 so that server 156 can exchange information with clients 158, 160, 162, 164.

As illustrated, network data distribution program 168 accumulates packet 194 and client-related data 196, 198, 200, 202 for multiple clients 158, 160, 162, 164. Each of the clients 158, 160, 162, 164 has requested the packet 194 which may be a periodic update clients 158, 160, 162, 164 receive relative to a parameter of the stock market. API 174 sends packet 194 which is destined for clients 158, 160, 162, 164 to device driver 176 with a single software interrupt 204. By processing and transferring the packet 194 destined for multiple clients 158, 160, 162, 164 from user space 152 to kernel space 154 with a single interrupt 204, interrupt overhead is minimized and system resources are optimized. This represents a significant reduction in software interrupts over existing implementations wherein existing APIs employ one software interrupt per client for the transfer and processing of one packet.

Device driver 176 temporarily stores packet 194 and associated client related information 196, 198, 200, 202 in a single buffer 206 prior to distributing packet 194 to clients 158, 160, 162, 164 via the multiple socket connections. By storing packet 194 and client related information 196, 198, 200, 202 in a single buffer 206 prior to distribution, the system of the present invention expends fewer memory allocations and optimizes system resources. It should be appreciated that although four clients 158, 160, 162, 164 are depicted receiving packet 194, the server of the present invention may service any number of clients and any subset of these clients may be receiving packet 194.

Figure 5:
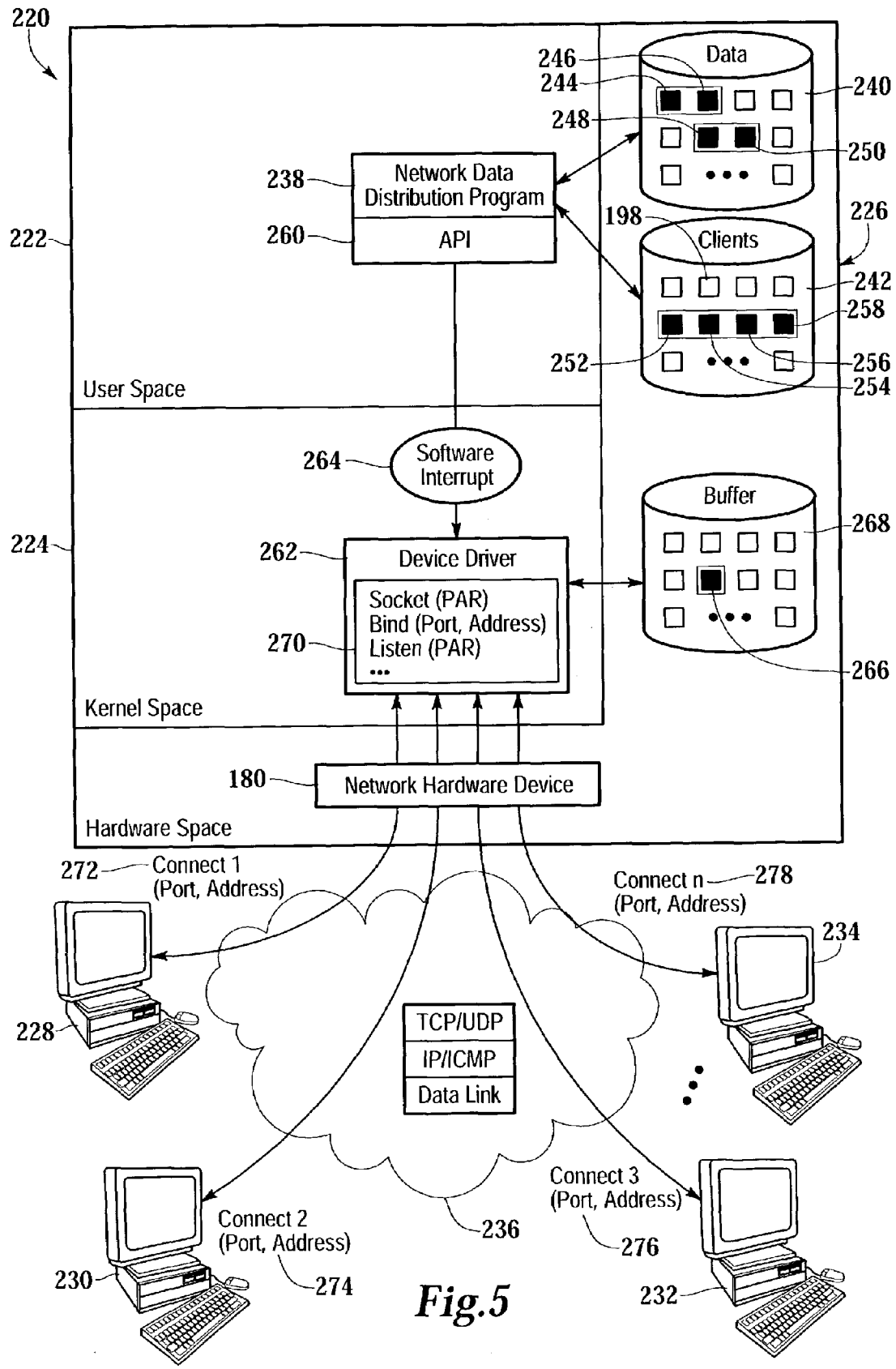
FIG. 5 is a schematic diagram of a system for transferring data between a user space and a kernel space associated with a server that is distributing multiple data packets to multiple clients.

FIG. 5 illustrates a system 220 for transferring packetized data between a user space 222 and a kernel space 224 associated with a server 226 that is distributing the packetized data to clients 228, 230, 232, 234. Similar to FIG. 4, FIG. 5 includes server 226 communicating to clients 228, 230, 232, 234 via socket connections enabled by a TCP/IP network 236. User space 222 includes a network data distribution program 238 which accesses data structures 240, 242 to accumulate packets 244, 246, 248, 250 of market-related information and packets 252, 254, 256, 258 of client-related information over a nominal time period for distribution to multiple clients.

As illustrated, in order to minimize interrupt overhead and optimize system resources, a driver-compliant API 260 processes and transfers packets 244, 246, 248, 250 of market-related information and packets 252, 254, 256, 258 of client-related information to a device driver 262 associated with kernel space 224 with a single software interrupt 264. In kernel space 224, to minimize memory usage and optimize system resources, the multiple packets 244, 246, 248, 250 of market-related information and packets 252, 254, 256, 258 of client-related information are stored in a single buffer 266 of a memory structure 268. Socket connections, as exemplified by socket port descriptor 270 and remote client socket identifiers 272, 274, 276, 278, enable the efficient distribution of the market-related data packets 244, 246, 248, 250 to clients 228, 230, 232, 234. As alluded to previously, the distributed network arrangement may distribute data other than securities information. For example, the multiple packets may represent streaming content being transferred to multiple clients to enable the multiple clients to receive audio and visual content almost immediately. The multiple packets may also be associated with files, such as audio, video, graphical or textual, provided by a web server.

Accordingly, in operation, the present invention minimizes interrupt overhead by providing for the transfer of multiple data packets bound for multiple clients from the user space to the kernel space with less than one interrupt per packet per client. Existing servers transfer data packets from the user space to the kernel space with one interrupt per packet per client, i.e., one interrupt per packet per socket connection, thereby resulting in excessive interrupt overhead. For example, if ten packets are bound for ten clients, then 100 software interrupts are required in existing servers to transfer the ten packets for the ten clients from the user space to the kernel space.

The present invention overcomes the interrupt overhead limitations of the existing servers by batch processing the client-bound packets. Specifically, with reference to the previous example, the present invention provides for the accumulation over a nominal period of time of the ten packets bound for each of the ten clients. The present invention then processes all the client-bound packets with preferably a single software interrupt. Hence, the present invention provides an interrupt overhead savings of 99 software interrupts in the instant example. It should be appreciated that in an actual application the number of data packets could be much greater, the number of clients could be much greater and the interrupt overhead savings would accordingly be much greater.

It should also be appreciated, however, that the teachings of the present invention provide for the processing of all the client-bound packets with any number of software interrupts that is less than one software interrupt per packet per client. For example, continuing with the example presented hereinabove, the ten packets bound for the ten clients, could be processed with 2, 10, 50 or 99 software interrupts, and an interrupt overhead savings would still be achieved. Additionally, in operation, the present invention provides for the optimization of memory allocation by establishing a scheme wherein all of the client-bound packets transferred from the user space to the kernel space may be stored in a single buffer. Existing kernels store the client-bound packets in one buffer per packet per client.

The benefits of the present invention may be further appreciated with reference to the following formulas that compare the existing scheme of transferring data between a user space and a kernel space and the system and method of the present invention for transferring data between a user space and a kernel space. The existing approach is as follows:

N=X*Y wherein N is the number of software interrupts generated by existing implementations; X is the number of data packets to be sent; and Y is the number of clients requiring the data packets.

The system and method of the present invention may be described as follows:

N'<X*Y and more preferably N'=1 wherein N' is the number of software interrupts generated by the systems and methods of the present invention; X is the number of data packets to be sent; and Y is the number of clients requiring the data packets. Accordingly, the present invention reduces the interrupt overhead by at least one interrupt and, preferably, by (X*Y-1) software interrupts.

Figure 6:
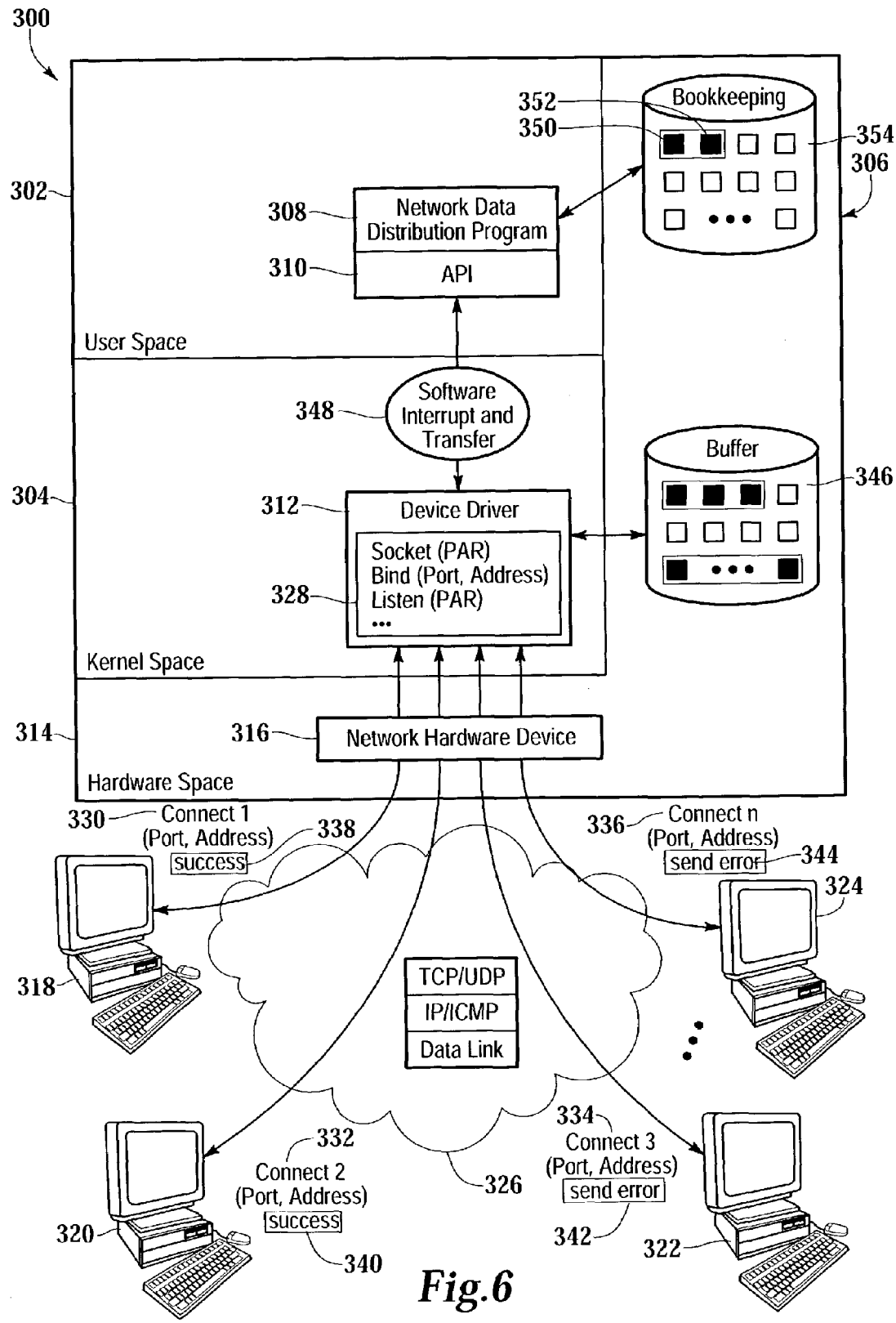
FIG. 6 is a schematic diagram of a system for transferring data between a user space and a kernel space associated with a server that is receiving multiple data packets from multiple clients.

FIG. 6 depicts a system 300 for transferring packetized data between a user space 302 and a kernel space 304 associated with a server 306 that is receiving multiple data packets from multiple clients. As previously described, user space 302 includes a network distribution program 308 and driver-compliant API 310, kernel space 304 includes a device driver 312 and a hardware space 314 includes a network hardware device 316. Server 306 has established socket connections with clients 318, 320, 322, 324 via a network 326 as represented by a socket port descriptor 328 of driver device 312 and remote client socket identifiers 330, 332, 334, 336 of clients 318, 320, 322, 324, respectively. At the completion of the transmission of packets between server 306 and any one of clients 318, 320, 322, 324, the socket connection will indicate that the transmission was successful as illustrated by success statuses 338, 340.

In the system of the present invention, device driver 312 accumulates success statuses 338, 340 indicative of successful transmissions in a memory structure 346 as represented by the "darkened" buffers. To minimize interrupt overhead and optimize system resources, device driver 312 does not transfer the success statuses 338, 340 to user space 302 since user space 302 does not require knowledge of successful transmissions to operate. By filtering the packets that are received from clients 318, 320, 322, 324 and forwarding only the packets to user space 302 that are required by user space 302, device driver 312 intelligently manages system resources. This is an improvement over existing device drivers which forward every packet received from the clients to the user space, regardless of the content of the packet or the packets necessity to the user space.

Per a request from user space 302, device driver 312 accumulates send error packets 342, 344 received from clients 322, 324, respectively, in memory structure 346. Subsequently, in response a software interrupt 348, device driver forwards all of the accumulated pertinent information about the socket connections, in the illustrated example, send errors 342, 344 with any accompanying data, to user space 302. API 310 accepts send errors 342, 344 and forwards send errors 342, 344 to network data distribution program 308 for storage in buffers 350, 352 of a memory structure 354 for proper bookkeeping. Accordingly, the present system optimizes the processing and storage resources of user space 302 by sending all of the accumulated connection status conditions in response to a single software interrupt. For example, over a period of time, if the kernel receives send errors packets from ten clients, rather than transferring the ten packets to the user space in response to receiving ten interrupts, the kernel transfers all the packets of the ten clients in response to receiving a single interrupt, thereby minimizing interrupt overhead and optimizing system resources.

Figure 7:
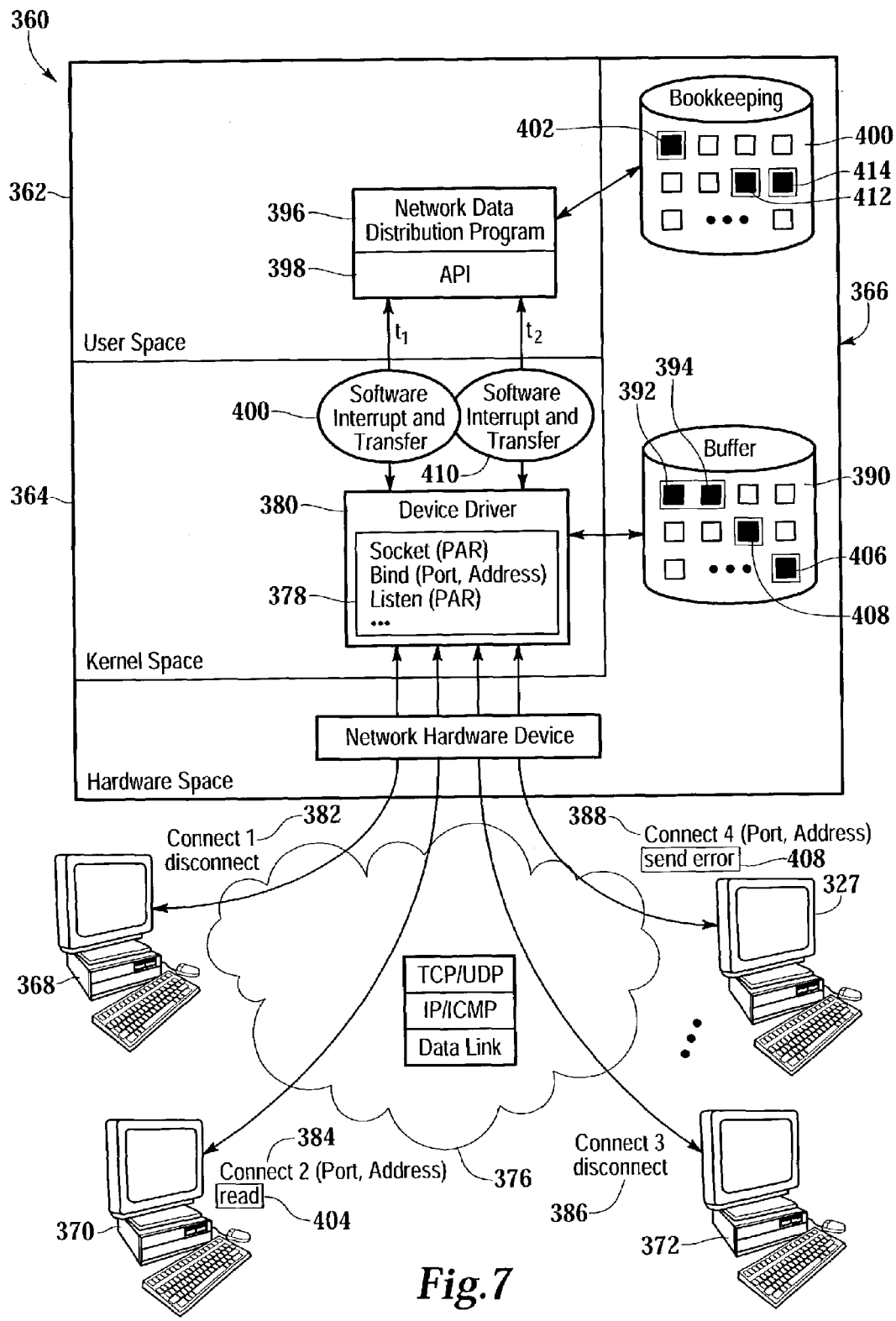
FIG. 7 is a schematic diagram of an alternate embodiment of a system for transferring data between a user space and a kernel space associated with a server that is receiving multiple data packets from multiple clients.

FIG. 7 illustrates an alternate embodiment of a system 360 for transferring data between a user space 362 and a kernel space 364 associated with a server 366 that is receiving multiple data packets from multiple clients. Similar to FIG. 6, server 366 has established socket connections with clients 368, 370, 372, 374 via a network 376 as represented by a socket port descriptor 378 of a device driver 380 positioned in kernel space 364 of server 366 and remote client socket identifiers 382, 384, 386, 388 of clients 368, 370, 372, 374, respectively. During the course of transmitting packets to the clients, different connection status conditions may arise, such as successful transmissions, read requests, send errors and disconnects, for example.

In the system of the present invention, device driver 380 accumulates over a nominal time period the various connection status conditions in a memory structure 390. For example, clients 368, 372 have disconnected from server 366 during the same nominal time period. The disconnect status connection conditions of clients 368, 372 are stored as buffers 392, 394, respectively, in memory structure 390. Similar to the description presented in relation to FIG. 6, to minimize interrupt overhead and optimize system resource, device driver 380 accumulates the disconnect status conditions and forwards an indication representative of the disconnects to a network data distribution program 396 via a driver-compliant API 398 in response to receiving a single software interrupt 400 at time $t_1$. Network data distribution program 396 stores the indicator in a memory structure 400 at buffer 402 for appropriate bookkeeping.

Subsequently, client 370 reports a read status connection 404 condition that is stored in memory structure 390 at buffer 406. Client 374 reports a send error 408 in the same nominal time period as client 370 reports read status connection condition 404. Device driver 380 stores the read status 404 in memory structure 390 at buffer 408. Device driver then forwards both the send error and read to network data distribution program 396 in response to receiving a single software interrupt 410 at time $t_2$. Accordingly, the present system optimizes the processing and storage resources of user space 362 by sending a single indicator representative of the connection statuses received and batch processing various status connection conditions with a single software interrupt. Network data distribution program 396 stores the read 404 and send error 408 in memory structure 400 at buffers 412 and 414, respectively, for proper bookkeeping.

Accordingly, in operation, the present invention minimizes interrupt overhead by providing for the transfer of multiple data packets received from multiple clients from the kernel space to the user space with less than one interrupt per packet per client. Existing servers transfer data packets from the kernel space to user space with one interrupt per packet per client, i.e., one interrupt per packet per socket connection, thereby resulting in excessive interrupt overhead. For example, if ten packets, such as success indications, are each received from ten clients, then 100 software interrupts are required in existing servers to transfer the ten packets received from the ten clients from the user space to the kernel space.

The present invention overcomes the interrupt overhead limitations of the existing servers by batch processing the packets. Specifically, with reference to the previous example, the present invention provides for the accumulation over a nominal period of time of the ten packets received from the ten clients. The present invention then processes all the received packets with preferably a single software interrupt. Hence, the present invention provides an interrupt overhead savings of 99 software interrupts in the instant example. It should be appreciated that in an actual application the number of data packets could be much greater, the number of clients could be much greater and accordingly the interrupt overhead savings would be much greater. It should also be appreciated, however, that the teachings of the present invention provide for the processing of all the received packets with any number of software interrupts that is less than one software interrupt per packet per client. For example, continuing with the example presented hereinabove, the ten packets received from the ten clients, could be processed with 2, 10, 50 or 99 software interrupts, and an interrupt overhead savings would still be achieved.

Figure 8:
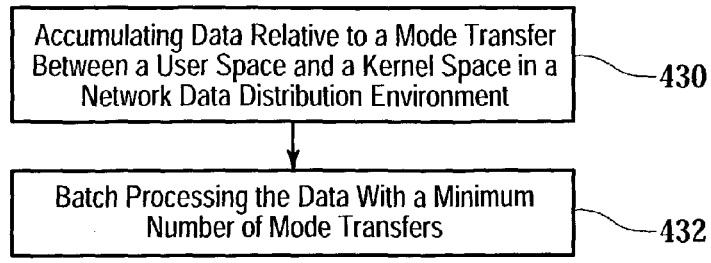
FIG. 8 is a flow chart of a method for minimizing the frequency of mode transfers between a user space and a kernel space associated with a server in a distributed network environment.

FIG. 8 depicts a method for minimizing the frequency of mode transfers between a user space and a kernel space associated with a server in a distributed network environment. At step 430, data relative to a mode transfer or software interrupt between a user space and a kernel space in a network data distribution environment is accumulated. At step 432, batch processing of the data with a minimum number of mode transfers occurs. It should be appreciated that the number of mode transfers is preferably less than one per packet per client. More preferably, as described hereinabove, the number of mode transfers is one.

Figure 9:
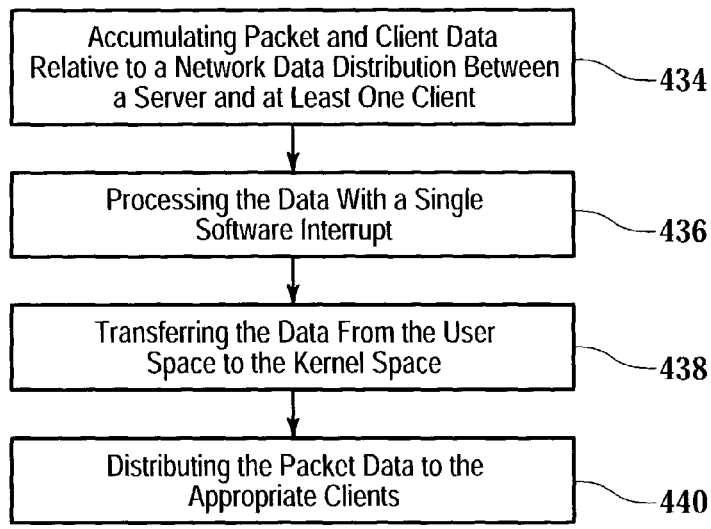
FIG. 9 is a flow chart illustrating a method for transferring data from a user space to a kernel space in accordance with the teachings of the present invention.

FIG. 9 illustrates a method for transferring data from a user space to a kernel space in accordance with the teachings of the present invention. At step 434, packet and client data relative to a network data distribution between a server and at least one client occurs. At step 436, the data is processed with a single software interrupt. At step 438, the data is transferred from the user space to the kernel space. At step 440, the packet data is distributed to the appropriate clients.

Figure 10:
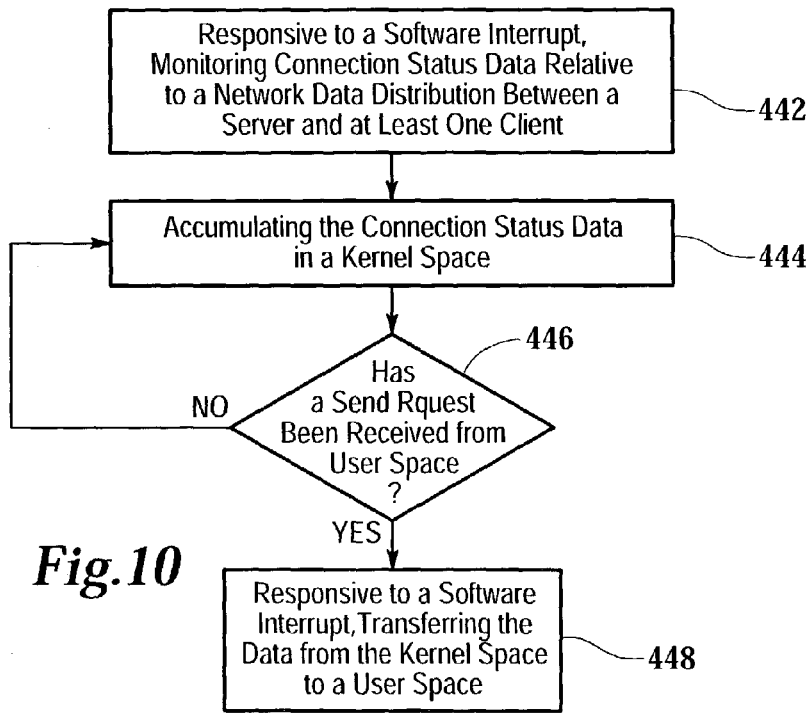
FIG. 10 is a flow chart illustrating a method for transferring data from a kernel space to a user space in accordance with the teachings of the present invention.

FIG. 10 depicts a method for transferring data from a kernel space to a user space in accordance with the teachings of the present invention. At step 442, in response to a request via a software interrupt from user space, the connection status data relative to a network data distribution between a server and at least one client is monitored. At step 444, the connection status data is accumulated in a kernel space. At decision block 446, until send request from the user space is received via a software interrupt, the method returns to step 444 to continue to accumulate data, as illustrated by the return flow arrow. At step 448, responsive to the receipt of a user space initiated software interrupt from which includes the send request, the kernel space transfers the accumulated data to the user space. Accordingly, the driver and driver-compliant application programming interface of the present invention provide a networking interface that queues asynchronous and synchronous packets and processes the packets with one software interrupt, thereby minimizing interrupt overhead and optimizing system resources including memory allocation.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for transferring a data set, accumulated from a plurality of sources, to a plurality of clients, the system comprising:
  a server, having a user space and a kernel space, in a distributed network arrangement with each of the plurality of clients over TCP/IP;
  a computer-readable medium embodying:
  a distribution program, wherein the distribution program operates in the user space, and wherein the distribution program accumulates a data set of packets from a plurality of sources;
  an application program interface, wherein the application program interface operates in the user space, and wherein the application program interface transfers the accumulated data set of packets to the kernel space with only one software interrupt;
  a memory structure, wherein the memory structure operates in the kernel space, and wherein the memory structure stores the accumulated data set of packets in a single buffer after the accumulated data set of packets has been transferred to kernel space, and
  a driver, wherein the driver operates in the kernel space, and wherein the driver distributes the accumulated data set in the single buffer to the plurality of clients responsive to the one software interrupt, wherein the driver distributes the accumulated data set in the single buffer to the plurality of clients responsive to the one software interrupt by distributing each of the packets in the accumulated data set of packets to a proper socket connection in kernel space.

2. The system as recited in claim 1 wherein the accumulated data set comprises data related to securities.

3. The system as recited in claim 1 wherein the accumulated data set comprises data related to streaming content.

4. The system as recited in claim 1 wherein the distribution program accumulates the data set over a pre-determined period of time.

5. The system as recited in claim 1 wherein the driver forms a socket connection with a client in the plurality of clients to transfer the accumulated data set from the server to that client.

6. A system for transferring a data set, accumulated from a plurality of sources, between a kernel space in a server and a user space in the server, the server in a distributed network arrangement with a plurality of clients over TCP/IP, the system comprising:

a computer-readable medium embodying:

a driver, wherein the driver operates in the kernel space, and wherein the driver accumulates a data set of packets relating to data transfers between the plurality of clients and the server and, responsive to a single software interrupt, transfer the accumulated data set to the user space; and a driver-compliant application program interface, wherein the driver-compliant application program interface operates in the user space, and wherein the driver-compliant application program interface receives the accumulated data set responsive to the single software interrupt; and a memory structure, wherein the memory structure operates in the kernel space, and wherein the memory structure stores the accumulated data set in a single buffer;

wherein the driver transfers the accumulated data set in the single buffer to the user space responsive to the single software interrupt by transferring each of the packets in the accumulated data set of packets to a program in user space associated with a proper socket connection for each of the packets.

7. The system as recited in claim 6 wherein the driver accumulates the data set in response to a request from the user space.

8. The system as recited in claim 6 wherein the driver forms a socket connection with the plurality of clients to receive data for the accumulated data set.

9. The system of claim 1 wherein the single buffer is a continuous block of memory in the server.

10. The system of claim 6 wherein the single buffer is a continuous block of memory in the server.

* * * * *